J. ROSH.
DRILL POUNDER.
APPLICATION FILED MAR. 30, 1920.
1,403,871. Patented Jan. 17, 1922.
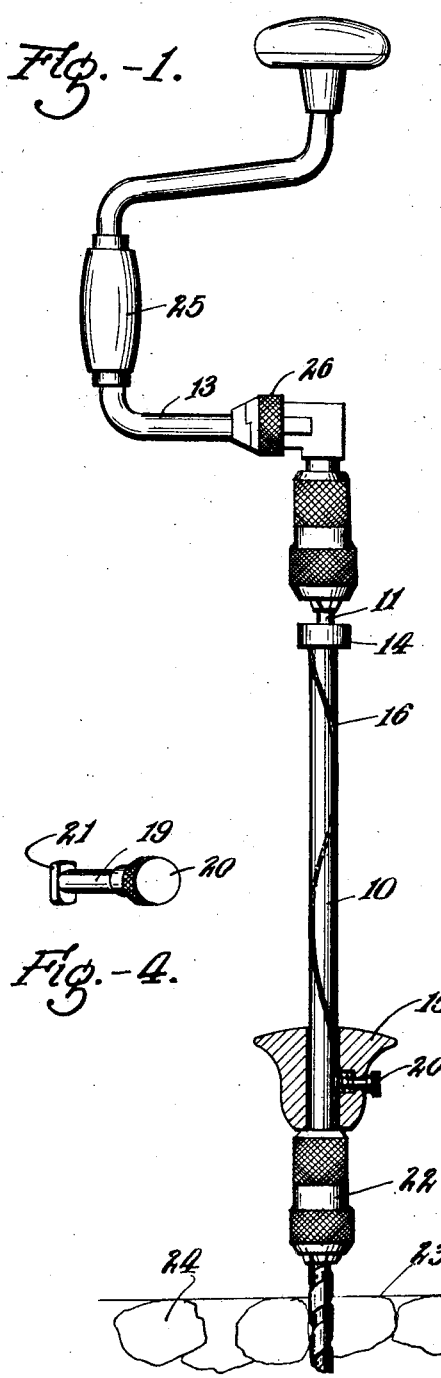
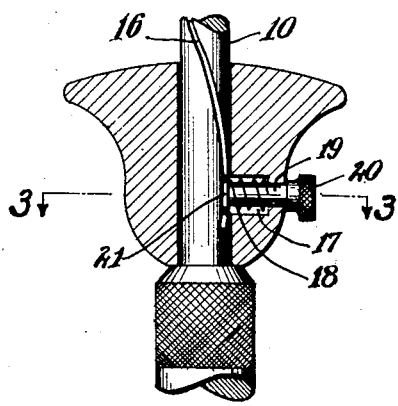
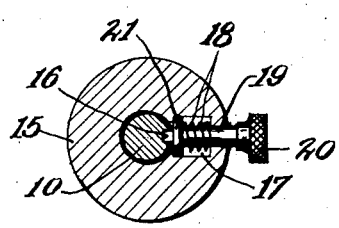
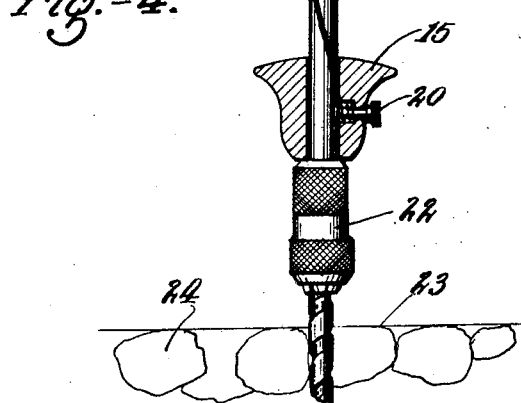
INVENTOR.
John Rosh
BY Harry Jacobson
ATTORNEY.

UNITED STATES PATENT OFFICE.

JOHN ROSH, OF KELAYRES, PENNSYLVANIA.

DRILL POUNDER.

1,403,871.  Specification of Letters Patent.  Patented Jan. 17, 1922.

Application filed March 30, 1920. Serial No. 369,863.

*To all whom it may concern:*

Be it known that I, JOHN ROSH, citizen of the United States, residing at Kelayres, in the county of Schuylkill and State of Pennsylvania, have invented certain new and useful Improvements in Drill Pounders, of which the following is a specification.

This invention relates to hand drills, and especially to the means for withdrawing a drill from the hole made thereby.

The object of this invention is the provision of manually operable means for delivering a sudden, outward blow on the drill holding implement, for withdrawing the drill from the hole.

A further object of this invention is the provision of means for giving the drill a backward turn for loosening said drill simultaneously with the delivery of the blow designed to withdraw the drill.

In drilling materials such as coal and the like, the tool and the tool holding parts often become too hot to be handled with safety. My device is designed to allow withdrawal of the drill from the material worked in, without touching the hot parts, by providing for the delivery of the hammer blow in the line of the drill axis, whereby none of the parts can be bent out of shape.

For the accomplishment of the aforesaid and other objects, I employ the device shown in its preferred form in the accompanying drawings, in which.

Fig. 1 is a front view and partial section of my invention as it appears in place ready for loosening up a drill.

Fig. 2 is an enlarged section of a part of my invention including the blow delivering means.

Fig. 3 is a horizontal section on line 3—3 of Fig. 2 and Fig. 4 is a perspective view of the groove engaging means.

In the practical embodiment of my invention, the rod 10 terminates at 11 in the usual square tang formed at one end of a drill, said tang being adapted from insertion into chuck 12 of brace 13. A head 14 is formed on said rod 10 below the tang and is designed to receive blows on the under side thereof when the hand pounder 15 is suddenly and forcibly raised. A helical groove 16 made with a comparatively large lead, is cut longitudinally in rod 10 so that an object following the groove makes approximately one turn in the length of the rod.

The pounder 15 is made of strong material which is a non-conductor of heat, such as wood or the like, is mounted on rod 10 for longitudinal slidable movement thereon, and has an opening 17 therein for receiving spring 18. A push rod 19 having a milled head 20 at one end thereof, and a flat narrow slide 21, designed to fit into groove 16, at the other end thereof, is rotatably mounted in pounder 15, said spring 18 being arranged to pass around rod 19 between slide 21 and the outermost wall of opening 17, to urge said slide toward said groove. A chuck 22, of the usual type constructed to receive drills therein, is attached to the lower end of rod 10 and removably holds drill 23 therein, said chuck acting to prevent the drill held therein from pulling out of the chuck when a pull is put thereon.

When it is desired to drill a substance such as the coal bed 24, drill 23 is fastened in chuck 22 on rod 10, and the upper end of said rod is then secured in the chuck of brace 13, which is operated in the usual manner to revolve said drill. By the time the hole is drilled to the desired depth, the drill 23 and the metallic parts connected thereto are usually too hot to touch without burning the fingers. To withdraw said drill without bending or touching it, it is necessary to apply a blow in the direction of the axis thereof. This is accomplished by grasping pounder 15, which remains cool because of its heat insulating property and which is shaped to fit the hand, and forcibly lifting said pounder suddenly until it impinges against head 14, whereby a blow is delivered on said head in the direction of the axis of rod 10, said rod acting to guide the pounder in the proper direction. The blow may be repeated as often as is desired.

If, at the same time, it is desired to rotate the drill 23 in the hole for loosening said drill, head 20 of push rod 19 is given a quarter turn, whereby slide 21 comes opposite to and is caused to enter groove 16 by the action of spring 18, after ratchet motion 26 of brace 13 has been set in the proper position, brace handle 25 is held with one hand to prevent rotation thereof, and pounder 15 is grasped with the other hand and held tightly to prevent its rotation.

It will be seen that a quick lift of said pounder causes slide 21 to move in groove 16, and if rotation of said pounder is prevented, causes rod 10 and drill 23 attached thereto, to rotate, whereby the drill is loosened, in the hole.

What I claim is:

In a device of the character described, a guide rod having a helical groove therein, a chuck at the lower end of said rod for holding a drill therein, an impact head near the upper end of said rod for receiving an upward blow thereon, a shank at the upper end of said rod adapted to be engaged by a chuck, and means slidably mounted on said rod for delivering an upward blow on said impact head in the line of the axis of said drill.

In testimony whereof I have affixed my signature this 26th day of March, 1920.

JOHN ROSH.